United States Patent Office 3,101,345
Patented Aug. 20, 1963

3,101,345
2-HYDROXYMETHYL-8-HYDROXY-1,4-BENZODIOXANE
Günther Schmidt, Biberach an der Riss, Germany, assignor to Dr. Karl Thomae G.m.b.H., Biberach an der Riss, Germany, a corporation of Germany
No Drawing. Filed Apr. 18, 1961, Ser. No. 103,729
Claims priority, application Germany Apr. 29, 1960
7 Claims. (Cl. 260—340.3)

This invention relates to 2-hydroxymethyl-8-hydroxy-1,4-benzodioxane as well as to a method of preparing the compound.

More particularly, the present invention relates to 2-hydroxymethyl-8-hydroxy-1,4-benzodioxane of the formula

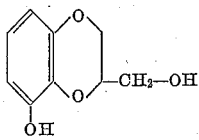

which I have found to be a very convenient starting compound for the preparation of N-substituted 2-aminomethyl-8-alkoxy-1,4-benzodioxanes, which are useful therapeutic agents in that they exhibit a very marked depressant action on the central nervous system.

These N-substituted 2-aminomethyl-8-alkoxy-1,4-benzodioxanes are most conveniently prepared by reacting a 2-hydroxymethyl-8-alkoxy-1,4-benzodioxane with thionyl chloride to form the corresponding 2-chloromethyl-8-alkoxy-1,4-benzodioxane and thereafter reacting the 2-chloromethyl-8-alkoxy-1,4-benzodioxane with an amine to exchange the chlorine in the 2-substituent for the desired amino group, according to the following schematic reaction formula:

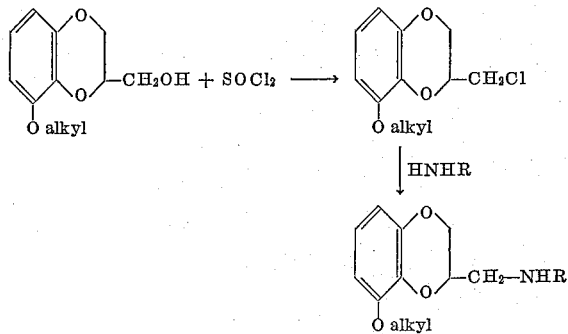

(See U.S. Patent 2,922,744 to Mills et al., Example 1.)

The 2-hydroxymethyl-8-alkoxy-1,4-benzodioxanes used as starting materials for the process have heretofore been very difficult to obtain in sufficiently pure, isomer-free form because the customary method for the preparation of such compounds, namely by reacting pyrogallol monoalkyl ethers with epichlorohydrin, always yields an isomeric mixture consisting of 5-alkoxy- and 8-alkoxy-2-hydroxymethyl-1,4-benzodioxanes whose separation can only be effected by a very long fractionation procedure which results in extremely high losses and is, therefore, very inefficient from the viewpoint of economy. Hence, in order to provide at least a partial improvement, 2-hydroxymethyl-8-alkoxy-1,4-benzodioxanes have been prepared by reacting a pyrogallol-1-monoalkyl ether, which itself is not very readily accessible (from 2-hydroxy-3-alkoxybenzaldehyde and hydrogen peroxide), with α,β-dibromopropionic acid esters to form an isomeric mixture composed of 5-alkoxy- and 8-alkoxy-1,4-benzodioxane-2-carboxylic acid esters; treating this isomeric mixture with ammonia to form an isomeric mixture of the corresponding 5-alkoxy- and 8-alkoxy-1,4-benzodioxane-2-carboxylic acid amides; treating this mixture of isomeric amides with ethanol, wherein the 8-alkoxy isomer is considerably more soluble than the 5-alkoxy isomer, to form an ethanolic solution of the 8-alkoxy isomer; isolating the 8-alkoxy-1,4-benzodioxane-2-carboxylic acid amide from this alcoholic solution by evaporation and purifying it; subjecting the 8-alkoxy amide to hydrolysis and esterification with ethanolic hydrochloric acid to form 2-carbethoxy-8-alkoxy-1,4-benzodioxane; and reducing the 2-carbethoxy compound with lithium-aluminum-hydride to form the desired 2-hydroxymethyl-8-alkoxy-1,4-benzodioxane substantially free from its 5-alkoxy isomer.

While this last method is a considerable improvement over the previous method, particularly with respect to the yields of the isomer-free 8-alkoxy product, it still leaves much to be desired from the point of view of economy and ease of operation. Consequently, there still exists a real need for a simple, economical process for the preparation of pure, isomer-free 2-hydroxymethyl-8-alkoxy-1,4-benzodioxanes.

It is, therefore, an object of the present invention to provide a simple, high-yield process for the preparation of isomer-free 8-alkoxy-2-hydroxymethyl-1,4-benzodioxanes from readily accessible starting materials.

Other objects and advantages of the present invention will become apparent as the description proceeds.

I have found that isomer-free 2-hydroxy-8-alkoxy-1,4-benzodioxanes are obtained with very satisfactory yields and in a very simple manner by starting with pyrogallol carbonate, which itself is obtained with good yields from pyrogallol and phosgene by known methods, and subjecting this starting material to a series of reactions represented by the following reaction equation to form 2-hydroxymethyl-8-hydroxy-1,4-benzodioxane as an intermediate:

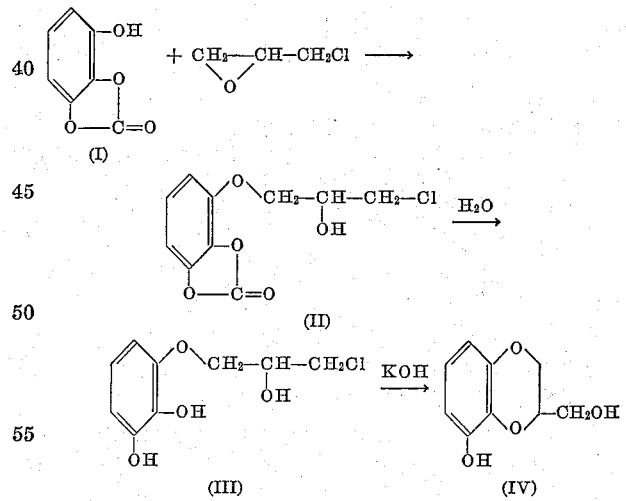

The intermediate products in this sequence of reactions do not need to be isolated; in other words, the preparation of 2-hydroxymethyl-8-hydroxy-1,4-benzodioxane may be carried out in uninterrupted fashion by what amounts to a single-step procedure.

More particularly, the process according to the present invention comprises first reacting pyrogallol carbonate with epichlorohydrin, preferably in equimolar amounts, in the presence of an acid, neutral or basic catalyst which is inert with respect to the five-membered ring of the pyrogallol carbonate and, if desired, in the presence of a solvent which is also inert toward the five-membered ring of the pyrogallol carbonate. This first phase of the reaction sequence is performed at elevated temperatures, preferably between 50 and 120° C., or at the boiling point of the inert solvent if one is used.

Examples of suitable catalysts which are inert toward the five-membered ring of the pyrogallol carbonate are the following: caustic soda, sodium amide, pyridine, triethylamine, sulfuric acid, potassium acetate, potassium phthalimide and the like.

Examples of inert solvents which may be employed are the following: ethylacetate, benzene, toluene, dioxane, cyclohexanone and the like.

If the first phase of the reaction sequence was performed in the presence of an inert solvent, it is distilled out of the reaction mixture before proceeding to the next phase.

The second phase comprises heating the reaction mixture of the first phase containing the condensation product of the formula

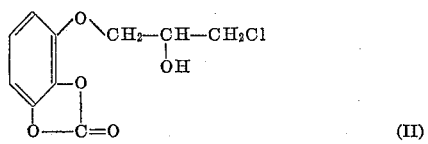

(II)

with water until evolution of carbon dioxide has ceased. This hydrolyzing treatment opens the five-membered carbonate ring of compound II and forms the compound of the formula

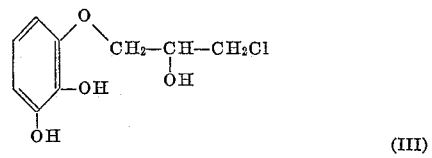

(III)

which is then, again without actual isolation thereof, heated together with a solution, preferably an aqueous solution, of an alkali metal hydroxide to effect ring closure and form the desired 2-hydroxymethyl-8-hydroxy-1,4-benzodioxane of the formula

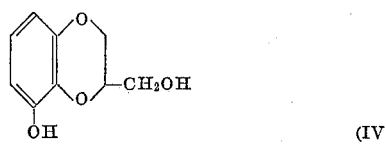

(IV)

The ring closure is accomplished by heating the reaction mixture for about one-half hour under reflux. The addition of the alkali metal hydroxide solution to the reaction mixture containing compound III as well as the subsequent refluxing should most advantageously be carried out in an atmosphere of an inert gas, such as nitrogen, because otherwise the reaction product might strongly discolor. The amount of alkali metal hydroxide added to the reaction mixture containing compound III should be at least two mols per mol of the starting materials, but a larger excess may also be added.

The resulting reaction mixture is then allowed to cool, adjusted to a pH of about 4 and finally extracted with an inert, water-immiscible organic solvent, such as ethyl acetate. The solvent is then evaporated from the extract solution, leaving 2-hydroxymethyl-8-hydroxy-1,4-benzodioxane as the residue, which is purified by vacuum distillation.

2-hydroxymethyl-8-hydroxy-1,4-benzodioxane is a new new product which has never before been described in the prior art.

In order to form the corresponding 2-hydroxymethyl-8-alkoxy-1,4-benzodioxanes for use as starting materials in the preparation of N-substituted 2-aminomethyl-8-alkoxy-1,4-benzodioxanes, the 2 - hydroxymethyl - 8 - hydroxy-1,4-benzodioxane merely needs to be alkylated in the 8-position by means of an alkylating agent according to known methods. The overall yield of pure, isomer-free 2-hydroxy-methyl-8-hydroxy-1,4-benzodioxane as an intermediate is more than 60% of theory, based on the amount of pyrogallol carbonate originally used.

The advantages of the process according to the present invention over the processes of the prior art are self-evident: Starting from a readily accessible starting material, the isomer-free 8-hydroxy intermediate can be prepared in an uninterrupted reaction sequence by means of simple operations and without expensive reagents or auxiliaries; no technically difficult operations are required for the introduction of the hydroxyl group into the 2-position substituent. Moreover, the process of the present invention avoids not only the tedious operations involved in the isomer separation of the prior art processes, but also affords a saving of half of the starting material which is used up for the formation of the undesired 5-isomer in the known processes.

The following examples illustrate the present invention and will enable others skilled in the art to understand the invention more completely. It should be understood, however, that the invention is not strictly limited to the specific conditions and materials recited in these illustrative examples.

EXAMPLE I

A mixture of 760 gm. (5 mols) of pyrogallol carbonate, 700 cc. of ethyl acetate, 463 gm. (5 mols) of epichlorohydrin and 13 cc. of anhydrous pyridine was refluxed for two hours on an oil bath at about 110° C., accompanied by stirring. Thereafter, the ethyl acetate was distilled off in vacuo and the residual reaction mixture, the major portion of which consisted of o-(3-chloro-2-hydroxy-propoxy)-pyrocatechol carbonate, was admixed with 1 liter of water. The resulting mixture was heated for thirty minutes on an oil bath at 150° C.; during this time a strong evolution of carbon dioxide took place. An aqueous mixture consisting largely of o-(3-chloro-2-hydroxy-propoxy)-pyrocatechol was formed. While keeping this mixture hot, an aqueous potassium hydroxide solution, containing 896 gm. (16 mols) of potassium hydroxide dissolved in 930 cc. of water, was added dropwise in an atmosphere of nitrogen. After all of the potassium hydroxide had been added, the resulting mixture was refluxed for thirty minutes in an atmosphere of nitrogen and was then allowed to cool. The reaction mixture was then made weakly acid (pH 4) with concentrated hydrochloric acid and was extracted with ethyl acetate. The extract solution was dried over sodium sulfate and distilled in vacuo. The distillation residue was 2-hydroxymethyl-8-hydroxy-1,4-benzodioxane having a boiling point of 135–145° C. at 0.05 mm. Hg. The yield was about 60% of theory, based on the amount of pyrogallol carbonate originally used. The initially oily product turned crystalline after some standing and, after recrystallization from benzene or chloroform, had a melting point of 100–103° C.

Analysis.—$C_9H_{10}O_4$; molecular weight=182.2. Calculated: C, 59.34%; H, 5.53%. Found: C, 59.10%; H, 5.67%.

EXAMPLE II

A mixture of 30.4 gm. (0.2 mol) of pyrogallol carbonate, 30 cc. of absolute benzene, 18.6 gm. (0.2 mol) of epichlorohydrin and 5 drops of concentrated sulfuric acid was refluxed for three hours on an oil bath at about 100° C., accompanied by stirring. Thereafter, the benzene was distilled off and the residual reaction mixture, consisting essentially of o-(3-chloro-2-hydroxy-propoxy)-pyrocatechol carbonate, was treated and worked up as described in Example I, yielding 2-hydroxymethyl-8-hydroxy-1,4-benzodioxane having the physical constants described in the preceding example.

EXAMPLE III

A mixture of 30.4 gm. (0.2 mol) of pyrogallol carbonate, 18.6 gm. (0.2 mol) of epichlorohydrin and 0.5 cc. of triethylamine was heated for one hundred twenty hours at 60° C., occasionally shaking the reaction mixture during that time. Thereafter, 30 cc. of water were added and the resulting mixture, consisting essentially of o-(3-chloro-2-hydroxy-propoxy)-pyrocatechol carbonate and water, was treated and worked up as described in Example I. The final product was 2-hydroxymethyl-8-hydroxy-1,4-benzodioxane.

EXAMPLE IV

A mixture of 23 gm. (0.15 mol) of pyrogallol carbonate, 100 cc. of cyclohexanone and 9 gm. of potassium phthalimide was stirred for a few minutes on an oil bath at 100° C. Thereafter, 14.0 gm. (0.15 mol) of epichlorohydrin were added and the resulting mixture was heated for 2.5 hours at 100° C., accompanied by stirring. The reaction mixture was then allowed to cool, the potassium phthalimide was filtered off and the cyclohexanone solvent was distilled off in vacuo from the filtrate. The residual mixture, consisting essentially of o-(3-chloro-2-hydroxy-propoxy)-pyrocatechol carbonate, was treated and worked up as described in Example I. The end product was 2-hydroxymethyl-8-hydroxy-1,4-benzodioxane.

EXAMPLE V

A mixture of 30.4 gm. (0.2 mol) of pyrogallol carbonate, 18.6 gm. (0.2 mol) of epichlorohydrin, 5.0 gm. of anhydrous potassium acetate and 100 cc. of cyclohexanone was heated for four hours on an oil bath at 100° C., accompanied by stirring. Thereafter, the cyclohexanone was distilled off and the residual mixture, consisting essentially of o-(3-chloro-2-hydroxy-propoxy)-pyrocatechol carbonate, was treated and worked up as described in Example I. The end product was 2-hydroxymethyl-8-hydroxy-1,4-benzodioxane.

EXAMPLE VI

A mixture of 30.4 gm. (0.2 mol) of pyrogallol carbonate, 18.6 gm. (0.2 mol) of epichlorohydrin, 3 small pellets of caustic soda and 100 cc. of cyclohexanone was heated for four hours on an oil bath at 100° C., accompanied by stirring. Thereafter, the cyclohexanone was distilled off and the residual mixture, consisting essentially of o-(3-chloro-2-hydroxy-propoxy)-pyrocatechol, was treated and worked up as described in Example I. The end product was 2-hydroxymethyl-8-hydroxy-1,4-benzodioxane.

EXAMPLE VII

A mixture of 30.4 gm. (0.2 mol) of pyrogallol carbonate, 18.6 gm. (0.2 mol) of epichlorohydrin, 1 cc. of a sodium amide suspension in benzene and 150 cc. of cyclohexanone was heated for four hours on an oil bath at 100° C., accompanied by stirring. Thereafter, the cyclohexanone was distilled off and the residual mixture, consisting essentially of o-(3-chloro-2-hydroxy-propoxy)-pyrocatechol, was treated and worked up as described in Example I. The end product was 2-hydroxymethyl-8-hydroxy-1,4-benzodioxane.

The following examples illustrate the conversion of 2-hydroxymethyl-8-hydroxy-1,4-benzodioxane into a 2-hydroxymethyl-8-alkoxy-1,4-benzodioxane and the transformation of the latter into an N-substituted 2-aminomethyl-8-alkoxy-1,4-benzodioxane.

EXAMPLE VIII

*Preparation of 2-γ-Hydroxypropylaminomethyl-8-Methoxy-1,4-Benzodioxane*

271 gm. (1.5 mols) of 2-hydroxymethyl-8-hydroxy-1,4-benzodioxane were dissolved in 600 cc. of warm water. To the resulting solution a solution of 64 gm. (1.6 mols) of sodium hydroxide in 120 cc. of water was added over a period of five minutes at 40° C. in a stream of nitrogen, while stirring. Thereafter, 200 gm. (1.6 mols) of dimethylsulfate were added dropwise over a period of thirty minutes, taking care that the temperature of the reaction mixture did not rise above 40° C. After all of the dimethylsulfate had been added the reaction mixture was stirred for one hour at room temperature. Subsequently, another solution of 32 gm. of sodium hydroxide in 100 cc. of water and an additional 100 gm. of dimethylsulfate were added, and the reaction mixture was stirred for another two hours at room temperature. Thereafter, the reaction mixture was extracted with chloroform. The chloroform extract solutions were washed first with an aqueous 2% NaOH solution and then with water, dried and distilled, yielding more than 80% of theory of 2-hydroxymethyl-8-methoxy-1,4-benzodioxane having a boiling point of 118–125° C. at 0.01 mm. Hg.

198 gm. of 2-hydroxymethyl-8-methoxy-1,4-benzodioxane were dissolved in a mixture of 300 cc. of chloroform and 96 gm. of pyridine. To the resulting solution 140 gm. of thionyl chloride were added dropwise while stirring. The resulting reaction mixture was refluxed for one hour, extracted with chloroform, and the extract solutions were washed with water and aqueous sodium bicarbonate, dried and distilled. The distillation residue was 2-chloromethyl-8-methoxy-1,4-benzodioxane having a boiling point of 128–130° C. at 0.1 mm. Hg. The yield was about 80% of theory.

A mixture of 544 gm. (2.54 mols) of 2-chloromethyl-8-methoxy-1,4-benzodioxane and 420 gm. (5.6 mols) of aminopropanol was heated for five hours at 150° C., accompanied by stirring. Thereafter, the reaction mixture was allowed to cool, a solution of 110 gm. of NaOH in 450 cc. of water was added, and the resulting mixture was extracted with chloroform. The chloroform extract solution was distilled, yielding as a distillation residue 2-γ-hydroxypropylamino-methyl-8-methoxy-1,4-benzodioxane having a boiling point of 177–180° C. at 0.02 mm. Hg. The yield was about 70% of theory. Its hydrochloric acid addition salt had a melting point of 135° C.

EXAMPLE IX 2-hydroxymethyl-8-ethoxy-1,4-benzodioxane was prepared by the same method as that described in Example VIII, except that diethylsulfate was used instead of dimethylsulfate as the alkylating agent. It had a boiling point of 120–130° C. at 0.02 mm. Hg.

The 2-hydroxymethyl-8-ethoxy-1,4-benzodioxane thus obtained was chlorinated with thionyl chloride, also as described in the preceding example, yielding 2-chloromethyl-8-ethoxy-1,4-benzodioxane having a boiling point of 112–120° C. at 0.2 mm. Hg.

Finally, the 2-chloromethyl-8-ethoxy-1,4-benzodioxane was refluxed with n-butylamine, yielding 2-n-butylaminomethyl-8-ethoxy-1,4-benzodioxane having a boiling point of 210–211° C. at 12 mm. Hg. Its hydrochloric acid addition salt had a melting point of 194–196° C.

While I have illustrated the present invention with the aid of certain specific embodiments thereof, it will be apparent to those skilled in the art that my invention is not limited to these embodiments and that various other changes and modifications may be made without departing from the spirit of the invention or the scope of the appended claims.

What is claimed is:

1. 2-hydroxymethyl-8-hydroxy-1,4-benzodioxane.
2. The process according to claim 6, wherein said catalyst is sulfuric acid.
3. The process according to claim 7, wherein said catalyst is sulfuric acid.
4. The process according to claim 6, wherein said o-(3-chloro-2-hydroxy-propoxy-pyrocatechol is heated with at least two mols of alkali metal hydroxide for each mol of pyrogallol carbonate and epichlorohydrin used as starting materials.
5. The process according to claim 7, wherein said aqueous reaction mixture is heated with at least two mols of alkali metal hydroxide for each mol of pyrogallol carbonate and epichlorohydrin used as starting materials.
6. The process of preparing 2-hydroxymethyl-8-hydroxy-1,4-benzodioxane, which comprises heating pyrogallol carbonate with epichlorohydrin in the presence of a catalyst which is inert with respect to the five-membered ring of the pyrogallol carbonate, said catalyst being selected from the group consisting of sodium hydroxide, sodium amide, pyridine, triethylamine, sulfuric acid, potassium acetate and potassium phthalimide to form o-(3-chloro-2-hydroxy-propoxy)-pyrocatechol carbonate, heating said o-(3-chloro-2-hydroxy-propoxy)-pyrocatechol carbonate with water to hydrolyze said pyrocatechol carbonate into o-(3-chloro-2-hydroxy-propoxy) - pyrocatechol, and heating said o-(3-chloro-2-hydroxy-propoxy)-pyrocatechol with an alkali metal hydroxide to form 2-hydroxymethyl-8-hydroxy-1,4-benzodioxane.

7. The process of preparing 2-hydroxymethyl-8-hydroxy-1,4-benzodioxane, which comprises heating a mixture of equimolar amounts of pyrogallol carbonate and epichlorohydrin in the presence of an inert organic solvent and in the presence of a catalyst which is inert with respect to the five-membered ring of the pyrogallol carbonate, said catalyst being selected from the group consisting of sodium hydroxide, sodium amide, pyridine, triethylamine, sulfuric acid, potassium acetate and potassium phthalimide, to temperatures between 50° C. and the boiling point of said organic solvent, distilling the solvent out of the reaction mixture, heating the distillation residue with water, and heating the resulting aqueous reaction mixture with an alkali metal hydroxide.

References Cited in the file of this patent
UNITED STATES PATENTS 2,922,744    Mills et al. _____ Jan. 26, 1960